United States Patent [19]

Carlson et al.

[11] 4,405,101
[45] Sep. 20, 1983

[54] VIBRATION ISOLATION SYSTEM

[75] Inventors: Raymond G. Carlson, Orange; Robert A. Stone, Sandy Hook, both of Conn.

[73] Assignee: United Technologies Corp., Hartford, Conn.

[21] Appl. No.: 201,876

[22] Filed: Oct. 29, 1980

[51] Int. Cl.³ .......................... B64C 27/04; F16F 7/10
[52] U.S. Cl. .................. 244/17.27; 416/500; 188/380; 248/555; 248/559; 248/638
[58] Field of Search ............ 244/17.11, 17.25, 17.27, 244/54; 188/378–380; 248/554–557, 559, 638, 618, 564; 416/500, 134 A

[56] References Cited

U.S. PATENT DOCUMENTS

| 1,973,510 | 9/1934 | Schieferstein | 188/378 |
| 2,744,749 | 5/1956 | Fiedor | 248/559 |
| 3,845,917 | 11/1974 | Drees | 244/17.27 |
| 4,088,042 | 5/1978 | Desjardius et al. | 244/17.27 |
| 4,140,028 | 2/1979 | Desjardius | 244/17.27 |
| 4,222,709 | 9/1980 | Mouille | 416/134 A |

OTHER PUBLICATIONS

Jones et al., "Advanced Development of a Helicopter Rotor Isolation System for Improved Reliability", USAAMRDL-TR-77-23A, DEC. 1977.
Desjardius et al., "Helicopter Rotor Vib. Iso.", 1978, Vertica, vol. 2, No. 2, pp. 145–159.

Primary Examiner—Galen L. Barefoot
Attorney, Agent, or Firm—Vernon F. Hauschild

[57] ABSTRACT

A vibration isolation system in which a supported body is supported from a vibration excitation body which is prone to vibrate at a predominant frequency and to impart such vibratory forces and motions to the supported body. The isolation system is of the antiresonant type and operable to provide vibration force and motion isolation of the supported body from the vibration excitation body both axially along and rotationally about three mutually perpendicular axes, thereby giving the supported body six degrees of vibration isolation from the vibration excitation body.

15 Claims, 8 Drawing Figures

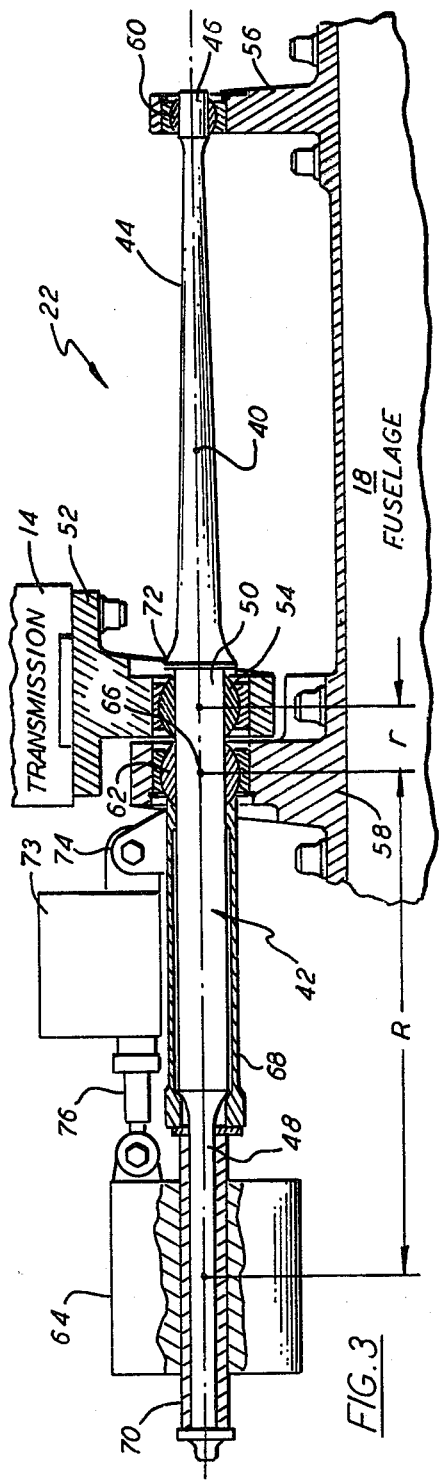
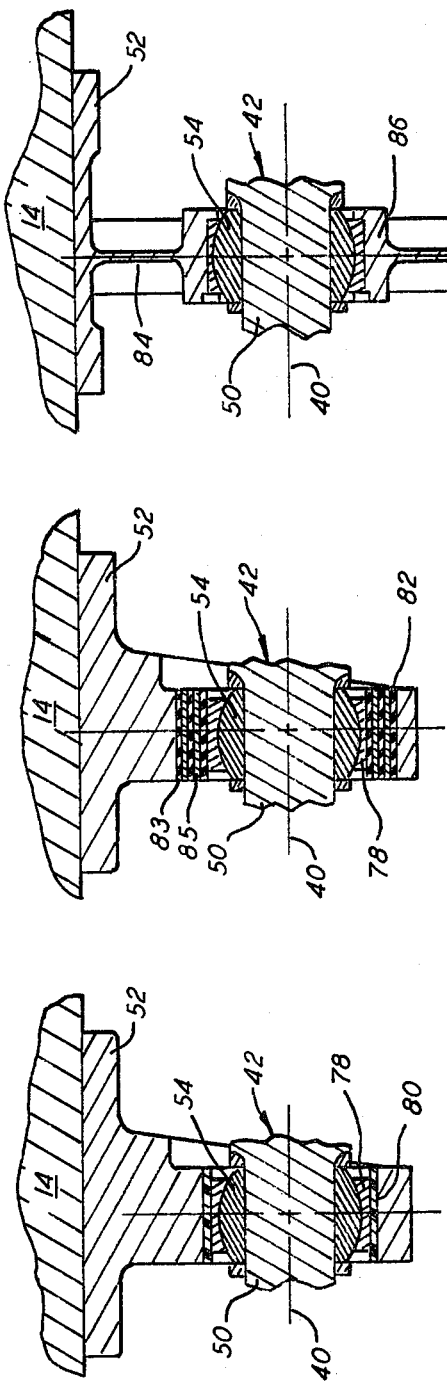

VIBRATION ISOLATION SYSTEM

DESCRIPTION

1. Technical Field

This invention relates to the isolation from vibratory forces and motions of a supported body supported from a vibration excitation body, and more particularly, to a support system therebetween which provides six degrees of vibration isolation, namely, vibration isolation linearly along and rotationally about three mutually perpendicular axes.

2. Background Art

In the vibration isolation art, the antiresonant principal is known in U.S. Pat. No. 3,322,379 but neither this patent nor any other known prior art provides vibration isolation in six degrees of freedom.

It is conventional practice in the prior art to effect vibration isolation of the suspended body from a vibration excitation body by supporting the suspended body from the vibration excitation body by soft springs. While this achieves vibration isolation, it has the serious disadvantage of being subject to substantial displacement between the bodies under steady state load conditions and this substantial relative displacement is unacceptable in embodiments where, for example, alignment of moving and/or rotating parts are necessary.

In addition, active vibration isolation systems have been used but these prove to be both very complex and very heavy.

The state of the art in this field is pretty well represented by the following patents: U.S. Pat. No. 4,088,042 which uses the antiresonant principle but in a vibration isolator which operates with one degree of freedom only and in which four such one degree of freedom isolators are used in combination to produce vibration isolation vertically, in pitch and in roll so that this patent teaches an isolation system having but three degrees of freedom. In contrast, our isolator is a two degree of freedom isolator, with four such isolators selectively combined so as to produce a system with six degrees of freedom.

U.S. Pat. No. 1,140,028 is a design variation of the above described 4,088,042 patent and replaces the torsion springs of the former patent with beam-type springs. This patent therefore also teaches an isolator with but one degree of freedom.

U.S. Pat. No. 3,514,054 relates to a transmission isolation system in which some degrees of freedom isolation are provided using an active, as opposed to passive, isolation system. Further, rigid connections are provided between the transmission and the fuselage to prevent motion in the other degrees of freedom taught herein. The system of this patent is different from ours in that it uses an active rather than a passive isolation system and it does not provide vibration isolation in all six degrees of freedom using antiresonance as in our invention.

DISCLOSURE OF INVENTION

A primary object of the present invention is to provide a support system between a supported body and the vibration prone body from which it is supported such that the supported body is provided with vibration isolation in six degrees of freedom, namely, with isolation from the motion and force of vibration axially along and rotationally around three mutually perpendicular axes.

It is a further object of this invention to provide such a support system which has low damping and which experiences but small deflection under steady state loading.

It is still a further object of this invention to teach such a support system which operates on the antiresonance principle so as to produce a vibratory node at the point of attachment between the vibration prone body and the supported body, thereby providing vibration isolation from the vibration of the vibration prone body to the supported body.

It is a further object of this invention to teach such a suspension and vibration isolation system which is insensitive to the characteristics, such as weight, of the supported body.

It is still a further object of this invention to teach such a support and vibration isolation system which is of the antiresonant variety and which can be automatically tuned to be antiresonant at different frequencies of the vibration excitation body.

Other objects and advantages of the present invention may be seen by referring to the following description and claims, read in conjunction with the accompanying drawings.

BRIEF DESCRIPTION OF THE DRAWINGS

FIG. 3 is a side view, partially broken away, of one of the two degree of freedom isolators used in our support and vibration isolation system.

FIGS. 4a, 4b and 4c are illustrations of constructions which may be used to connect our isolator to the helicopter transmission with axial freedom therebetween.

BEST MODE FOR CARRYING OUT THE INVENTION

For purposes of explanation, our invention will be explained in the environment of a helicopter but it will be evident to those skilled in the art that it could be used as a suspension system between any two bodies in which it is desired to support one body from a vibration prone body and to provide the supported body with vibration isolation in six degrees of freedom from the vibrations which would otherwise be imparted thereto by the vibration prone body.

Figure 1:
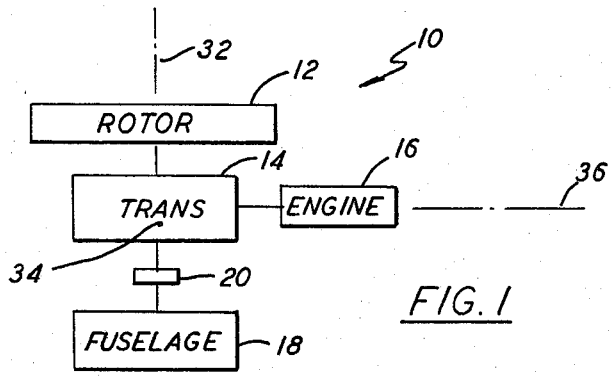
FIG. 1 is a schematic representation of a modern helicopter of conventional design in which the helicopter rotor is suspended and driven from an engine driven transmission, and in which the helicopter fuselage is suspended through a suspension system from the transmission housing.

Referring to FIG. 1, we see a representation of a conventional helicopter, for example, of the type shown in U.S. Pat. No. 3,380,564 wherein helicopter lift rotor 12 is suspended for rotation by and driven by helicopter transmission 14, which is in turn driven by engine 16. Transmission 14 and engine 16 are conventionally located in helicopter fuselage 18, which is supported or suspended from transmission 14 by support system 20. Accordingly, lift rotor 12 is driven by engine 16 through transmission 14 so as to generate lift, the rotor lifts the transmission therewith, which in turn lifts the fuselage 18 therewith since fuselage 18 is supported from transmission 14 by support system 20. Helicopter rotors are prone to vibration and these vibrations are imparted to the transmission and would, in turn, be imparted to the fuselage if vibration isolation were not provided in the support system 20 between the transmission and the fuselage. Our support system 20 provides this vibration isolation and will now be described.

Helicopter 10 has vertical axis 32, longitudinal axis 36, and lateral axis 34 extending perpendicular to the plane of the FIG. 1 drawing at the point of intersection of axes 32 and 36. Axes 32, 34 and 36 are mutually perpendicular.

Figure 2:
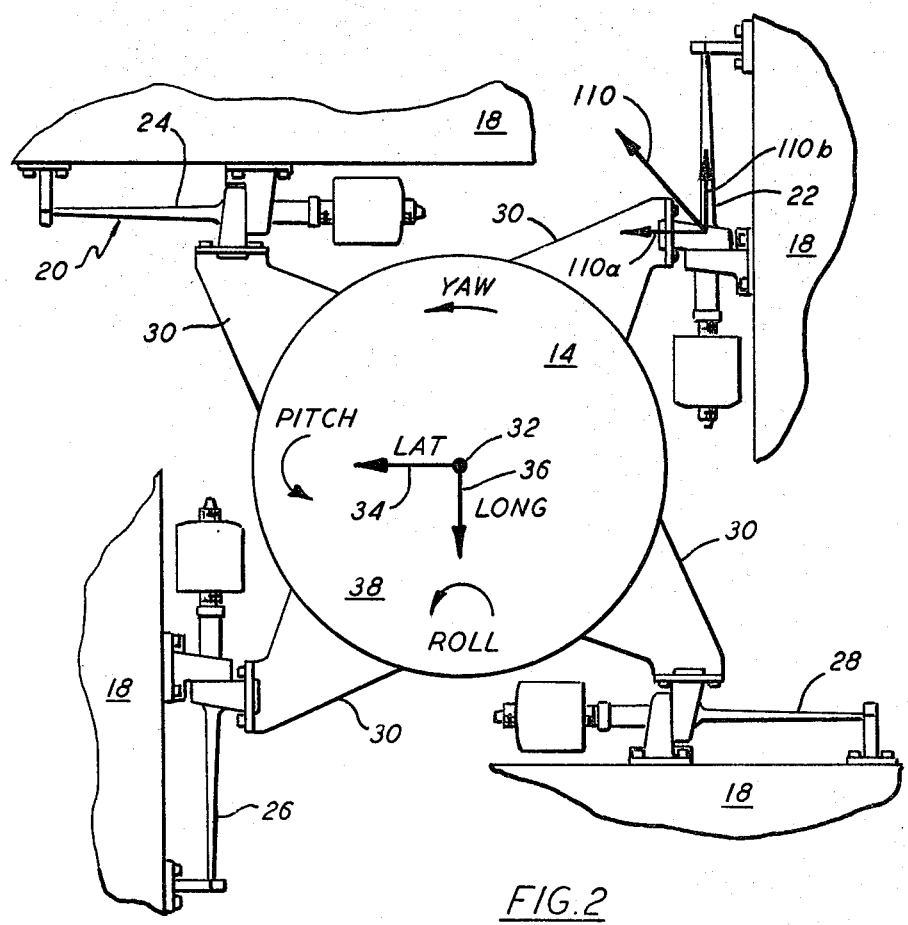
FIG. 2 is a top view of the helicopter transmission housing supporting the fuselage utilizing our unique suspension and vibration isolation system therebetween.

Our support system 20 with vibration isolation capabilities is shown in FIG. 2 wherein fuselage 18 is supported from transmission 14 by means of our suspension system 20, which comprises four isolators 22, 24, 26 and 28 spaced circumferentially about transmission 14 and joined thereto through support arms 30. Transmission 14 and fuselage 18 are capable of moving relative to one another as vibration is imparted to the transmission 14 to the fuselage 18 linearly along and rotationally about vertical axis 32 which extends perpendicularly out of the paper in FIG. 2, lateral axis 34, which extends laterally between the port and starboard sides of helicopter 10, and longitudinal axis 36, which extends longitudinally along helicopter 10 between the forward and aft portion thereof. Axes 32, 34 and 36 are mutually perpendicular and axes 34 and 36 lie in a common plane 38, which is the surface of the sheet in FIG. 2. Isolators 22 through 28 have their axes located in plane 38.

Axes 32, 34 and 36 are important in the description of our isolation system since our isolation system provides isolation of fuselage 18 from transmission 14 from vibratory forces and motions linearly along axes 32, 34 and 36 and rotationally about axes 32, 34 and 36. In the helicopter environment, vibratory forces and motions linearly along axis 32 are in the vertical direction, vibratory forces and motions linearly along axis 34 are in the lateral direction, and vibratory forces and motions linearly along axis 36 are in the longitudinal direction. Vibratory forces and motions in moment fashion rotationally about axis 32 are described as helicopter yaw, vibratory forces and motions in moment fashion rotationally about lateral axis 34 are described as helicopter pitch, and vibratory forces and motions in moment fashion rotationally about axis 36 are known as helicopter roll.

By viewing FIG. 2 it will be noted that isolators 22, 24, 26 and 28 are successively perpendicular in circumferential array about axis 32, that each is displaced from each of axes 32, 34 and 36, that isolators 22 and 24 form a diagonally opposite pair of parallel and oppositely directed, i.e., opposed isolators and that isolators 24 and 28 form a diagonally opposite pair of parallel and oppositely directed, i.e., opposed isolators. Isolators 22 and 24, as well as isolators 24 and 26, as well as isolators 26 and 28, as well as isolators 28 and 22 form adjacent pairs of perpendicular isolators. While our preferred embodiment is illustrated as having four isolators, it should be borne in mind that three such isolators equally spaced about vertical axis 32 and lying in plane 38 would be sufficient but four isolators are preferred to provide redundancy.

Since each isolator 22, 24, 26 and 28 is identical in construction, a single isolator 22 only will be described. That single isolator 22 is shown in FIG. 3 to which attention is now directed. Isolator 22 is symmetric about axis 40, which axis 40 lies in plane 38. Shaft member 42, which is of circular cross section and concentric about axis 40, comprises first tapered flexible end 44, which culminates in shaft tip 46, second flexible end 48, and central portion 50 therebetween. Central portion 50 of shaft 42 is connected to transmission 14 by support means 52 so that shaft 42 is both axially and universally movable with respect to transmission 14 at support 52. Spherical bearing 54, envelops shaft portion 50 in slip fit fashion so as to permit relative axial motion along axis 40 between transmission 14 and isolator 22. Spherical bearing 54 also supports isolator 22 for universal motion from transmission 14 so as to permit univeral motion therebetween. Fuselage 18 is connected to shaft 42 by axially spaced support members 56 and 58, which connect to shaft tip 46 and shaft central portion 50, respectively, through spherical bearings 60 and 62. Bearing 60 envelops shaft 42 in slip fit fashion so as to permit axial motion between isolator 22 and fuselage 18 at station 56 and, spherical bearings 60 and 62 also permit universal motion between isolator 22 and fuselage 18 at stations 56 and 58. It will be noted that support members 56 and 58 are positioned on opposite sides of support member 52 and that support members 54 and 56 are adjacent. Shaft flexible end 48 extends in cantilever fashion axially outwardly from support 58 and has inertial mass 64 supported from the end thereof. The flexibility of shaft end 48 accentuates the displacement of the inertial mass 64 in response to rotor vibrations at the predominant frequency. Sleeve members 68 and 70 envelop shaft flexible end 48 and serve to position shaft 42 with respect to support 58 in cooperation with shaft lip 72.

This particular construction of isolator is capable of operating in antiresonant mode so that a vibration node is established at point 66 when the rotor generated vibrations are at their predominant frequency, such as blade passage frequency which equals the number of blades in a helicopter rotor times RPM. This can be accomplished in part because tapered flexible end 44 of shaft 42 is equally flexible in all radial directions due to its taper, circular cross section, and concentricity about axis 40 and spherical bearing support. Shaft 42 is therefore equally flexible in the direction of vertical axis 32 and the common plane 38 of axes 34 and 36 so that isolator 22 is said to be a two degree of freedom isolator. Due to its construction, and its support between transmission support 52 and fuselage supports 56 and 58, shaft flexible end 44 is actually a spring which deflects in response to steady state and vibratory forces exerted between transmission 14 and fuselage 18. This deflection of spring 44 due to vibratory forces imposes a spring force on support members 56 and 58. Simultaneously, these vibratory forces exerted between transmission 14 and 18 cause shaft end 48 to deflect and, due to the presence of selected mass 64 on end 48 at a selected distance R from support 58 an inertial force is created, which inertial force is equal and opposite to the spring force generated by spring 44, and is applied to supports 56 and 58 so as to cancel the force being imparted thereto by spring 44 and thereby establishes antiresonance so that a vibratory node is produced at point 66 so that neither the force nor motion of vibrations are passed therethrough from transmission 14 to fuselage 18. The mass of 64 and distance R are selected to that antiresonance occurs when the rotor is generating vibrations at its predominant frequency.

It will therefore be seen that isolator 22, and the other isolators 24, 26 and 28, are designed to operate in antiresonant mode when the helicopter rotor is generating vibrations at its predominant frequency. With isolator 22 operating in this antiresonant mode, the vibration generated deflection to shaft end 44 imposes a load on support means 58 which is cancelled by an equal and opposite inertial load imposed upon support 58 by the vibration generated deflections of shaft end 48. The imposition of these equal and opposite loads on support 58 creates a vibratory node at point 66 when the rotor is generating vibrations at its predominant frequency. Neither rotor created vibration forces nor motions, which would normally be transmitted from the transmission to the fuselage, can be so transmitted under these conditions due to the nodal operation at point 66 of support 58.

Isolator 22, and the other isolators, may include a parameter sensitive actuator 73 which may be a reversible electric motor driven by sensors which detect rotor RPM; or other pertinent parameters, to selectively position mass 64 on the flexible end 48 of shaft 42 as a function of the controlling parameter to thereby tune the isolator. Actuator 73 is pivotally supported at pivot connection 74 so as to be able to accommodate deflecture of shaft end 48 and is connected to mass member 64 in any convenient fashion such as shaft arrangement 76, wherein rotation of the electric motor in actuator 73 causes linear motion to mass 64 along shaft end 48, thereby varying the inertial loading applied thereby to support 58. It will be evident to those skilled in the art that this tuning could also be accomplished by varying the rate of spring 44.

In the construction of the isolators, it is important that the isolator shaft or rod 42 have axial freedom and, while rod 42 is received by fuselage support 56 so as to be axially slideable therein, in slip fit fashion, a similar axial freedom must exist between shaft 42 and transmission support member 52. Alternate constructions providing axial freedom of shaft 42 within support 52 are shown in FIGS. 4a, 4b and 4c which will now be described. Viewing FIG. 4a, it will be noted that the axial freedom of shaft 42 within support 52 is provided because the outer race 78 of spherical bearing 54 is received in low friction sleeve 80 of support 52, to thereby provide a low friction sliding surface between sleeve 80 and the outer surface of race 78. Sleeve 80 may be made of teflon to provide this low friction sliding surface when race 78 is made of steel.

Now viewing FIG. 4b, it will be noted that spherical bearing 54 is positioned in support 52 by means of elastomeric bearing 82, which extends circumferentially around the outer race 78 of bearing 54. Elastomeric bearing 82 may be made either of a ring of highly flexible material, or a ring fabricated from alternate layers of elastomeric material and metal rings or cylinders, such as 83 and 85, respectively, so that, in either case, when axial loading is applied on shaft 42, the elastomeric bearing will yield in that direction to provide axial freedom of motion for shaft 42 from support 52.

Now viewing the FIG. 4c construction, it will be noted that support 52 is fabricated so as to support flexible diaphragm 84 which envelops and supports ring member 86, which in turn envelops and supports spherical bearing 54. In view of the presence of flexible diaphragm 84, axial loading of shaft 42 will produce axial loading of flexible diaphragm 84 and the deflection thereof such that shaft 42 has axial freedom of motion with respect to support 52.

Figure 5:
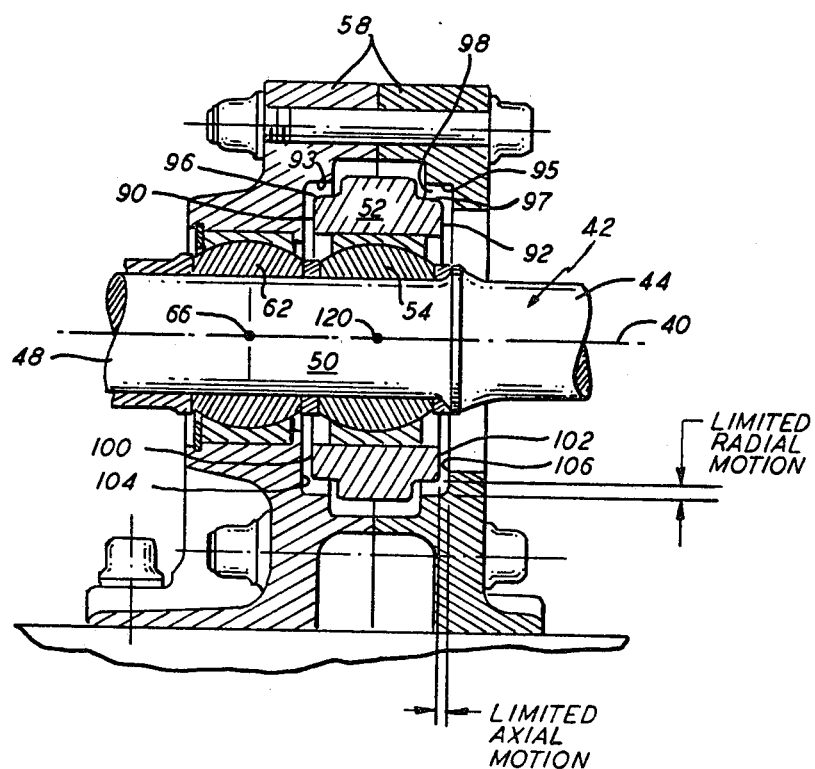
FIG. 5 is a cross-sectional showing of another modification of design by which the isolator can be connected to the transmission housing with provisions for axial freedom therebetween and with fail-safe provisions for the isolator shaft.

Another potential mounting arrangement between transmission support means 52 and isolator shaft 42 is shown in FIG. 5. This mounting arrangement is fail-safe in that it not only provides for axial motion between shaft 42 and support 52, but also provides positive limit stops to that axial motion so as to prevent shaft failure. As shown in FIG.5, shaft 42 extends between spherical bearings 54 and 62. While spherical bearing 54 directly connects shaft 42 to transmission support 52 in axial slip fit fashion, spherical bearing 62 is directly connected to split fuselage support 58. Support 52 is shaped to have capture collars 90 and 92 on opposite axial sides thereof. Capture collars are received in selectively shaped annular recess 98 in support 58 so that positive mechanical stops are provided for collars 90 and 92 in annular recess 98 in both the axial and radial direction. This fail-safe feature which prevents spring bar 44 from being over-stressed by providing an alternate load path between transmission fitting 52 and fuselage fitting 58.

Whenever the transmission fitting 52 is loaded to deflect bar portion 44, such that surfaces 96 and 97 of collars 90 or 92 contact surfaces 93 and 95 of annular recess surface 88, the radial load in the bar 42 is relieved and is transmitted directly fitting 52 to 58.

Similarly, if the axial displacement of transmission fitting 52 is sufficient for surfaces 100 or 102 of support 52 to contact surfaces 104 or 106 of annular recess 98 the load is transmitted directly from fitting 52 to 58 thereby limiting this axial displacement. This feature of the FIG. 5 modification protects against a failure of the shaft or bearings when operational design loads are exceeded such as those anticipated in crash conditions, by providing an alternate load path between transmission and the fuselage.

The operation of our suspension system 20 will now be described so as to illustrate how it provides vibration isolation of the fuselage from the rotor vibrations of predominant frequency so as to provide isolation in six degrees of freedom. In this connection, attention is directed to FIG. 2. As stated earlier, the isolation of fuselage 18 from the rotor vibrations which is affored by our suspension system 20 incldes isolation from vibratory forces and motions both linearly along and rotationally about axes 32, 34 and 36, thereby constituting vibration isolation in all six degrees of freedom. Vibration isolation in each of those degrees of freedom will be described separately.

First, vibratory forces and motions along vertical axis 32 are reacted by the loading of all actuators 22 through 28, however, due to the antiresonant nodal connection at 66 (see FIG. 3) in each isolator, these vertical vibratory forces and motions are not transmitted from the transmission to the fuselage but, rather, the fuselage is isolated therefrom.

Secondly, vibratory forces and motions along lateral axis 34 are reacted by the loading of opposite isolator pairs 22 and 26 but are not imparted to fuselage 18 due to the nodel connection 66 between the transmission and the fuselage in each of these isolators. Isolators 24 and 28 translate axially in response to vibratory forces and motions along lateral axis 34.

Thirdly, vibratory forces and motions along longitudinal axis 36 are not imparted to fuselage 18 because they are reacted by the loading of diagonally opposite isolator pairs 28 and 24 and, due to nodal connection 66 in each between the transmission and the fuselage, the vibratory forces and motions will not be imparted to the fuselage. Isolator pair 22 and 26 translate axially in response to vibratory forces and motions along longitudinal axis 36.

Fourthly, vibratory yaw moment forces and motions around vertical axis 32 are not imparted in the fuselage because such yaw moments impose an equal loading on each isolator 22-28 along vector 110 shown on isolator 22 in FIG. 2. The capability for axial translation along each isolator restricts the loading to act along vector 110a. This vibratory loading produces no vibration of the fuselage due to the nodal connection 66 between transmission 14 and fuselage 18.

Fifthly, vibratory roll moment forces and motions around longitudinal axis 36 are reacted by loading in a first direction of adjacent actuator pairs 24 and 26 and the simultaneous loading in the opposite direction of adjacent actuator pairs 22 and 28. Vibration due to these loads will not be imparted to fuselage 18 due to the nodal points of connection 66.

Sixthly, vibratory pitch moment forces and motions are not imparted from the transmission to the fuselage because they result in loading in a first direction of adjacent isolator pairs 26 and 28 and loading simultaneously in the opposite direction of adjacent isolator pairs 22 and 24, but the nodal connection 66 of each isolator permits no vibratory force or motion to be thereby imparted to the fuselage 18.

It will therefore be seen that our isolator system 20 isolates the fuselage 18 from the vibrations of the rotor and transmission when the rotor is generating vibrations at its predominant frequency with respect to each of the six following conditions, namely, vibratory forces and motions along vertical axis 32, vibratory forces and motions along lateral axis 34, vibratory forces and motions along longitudinal axis 36, yaw moment vibratory force and motions about axis 32, pitch moment vibratory forces and motions about axis 34, and roll moment vibratory forces and motions about axis 36.

Another important feature of our isolator system 20 is that, in addition to providing freedom of vibration to the helicopter in the air degrees of freedom just described, it is also capable of transmitting steady state loads between the transmission and the fuselage with minimal deflection. This is so because spring 44 of isolators 22-28 can be made quite stiff as compared to the soft springs which are conventionally used for purposes of vibration isolation. Spring 44 can be made quite stiff since a cancelling inertial force can always be obtained by proper selection of the mass of member 64 (FIG. 3) and its radius R from nodel point 66.

Our suspension system 20 is low in damping in that springs 44 have low inherent damping. Further, the antiresonant capability of our suspension system 20 is aided by the fact that the helicopter fuselage mass moment of inertia is relatively large. A rod-type spring 44 attached to the fuselage at two points, will have a near zero response at both fuselage attachment points at antiresonance, provided the isolated body mass moment of inertia is relatively large, as it is for a fuselage. In addition, a complete analysis shows the moment transmitted, as well as the vibratory force, approaches zero. Thus, the rod spring is equivalent to a spring with a single point of attachment to the fuselage. Still another advantage of our system is that it is relatively insensitive to the characteristics of the isolated body of the fuselage. Variations in fuselage weight, possibly due to variations in cargo load being carried, can be accommodated without deterioration of the isolation effectiveness.

While we have disclosed our preferred embodiment herein, it should be noted that other constructions are also possible within the teaching of our invention. For example, isolator units 22-26 could be reversed end-for-end from the fashion shown in FIG. 2. Further, while four isolators are illustrated in FIG. 2, two isolators could well be used side-by-side for each of the single isolators 22-28 shown in FIG. 1. Still further, the four isolators shown in FIG. 2 could each be rotated radially outwardly 45° or the like. Still further, isolation could be achieved using any three isolators shown in FIG. 2. The fourth unit provides structural redundancy and distributes the vibratory loading more uniformly between units.

Figure 6:
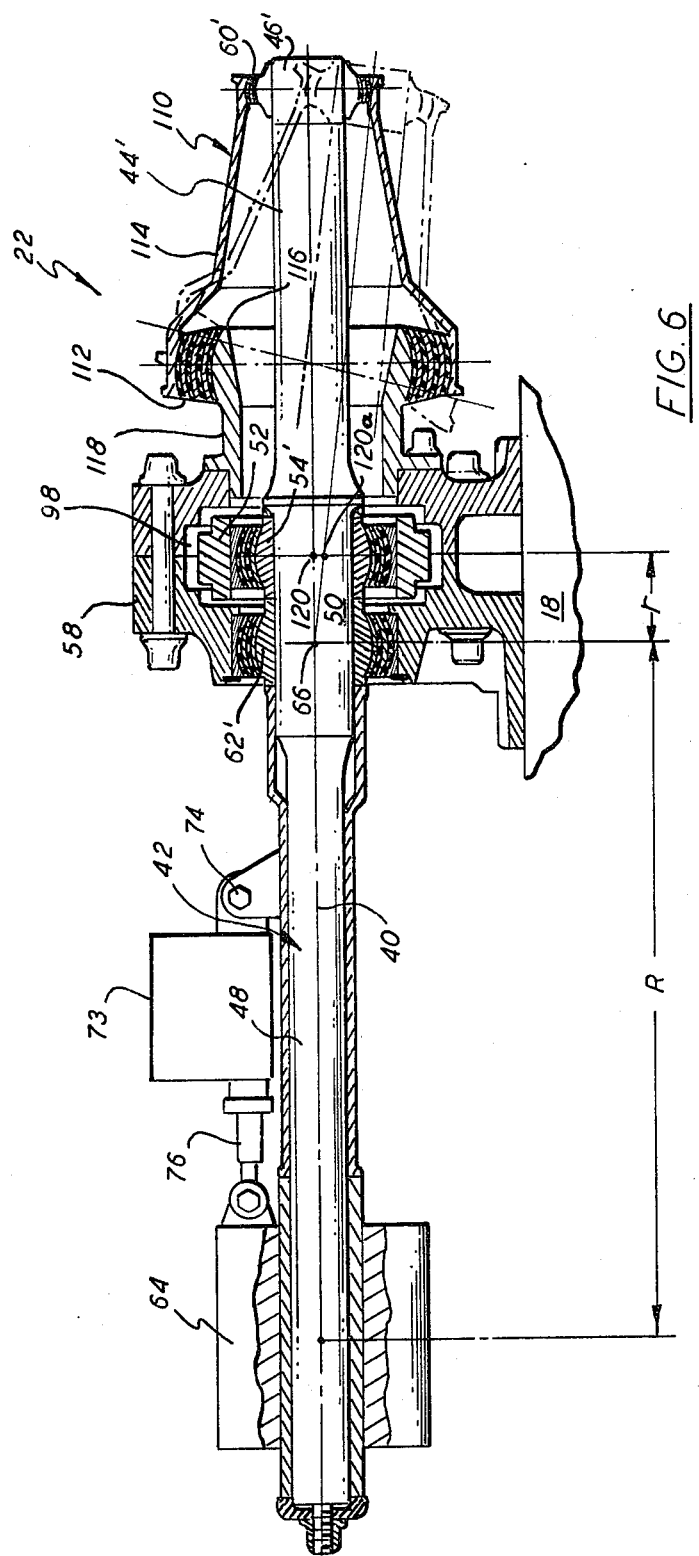
FIG. 6 is a showing of a modified isolator similar to the isolator shown in FIGS. 3 and 5 but utilizing a shortened shaft end as a substitute for the elongated flexible shaft end of the FIGS. 3 and 5 constructions.

The modified isolator is shown in FIG. 6 which is similar to the isolator of FIGS. 3 and 5 and therefore the same reference numerals will be used to describe identical parts and corresponding, but primed reference numerals will be used to describe substitute parts. In the FIG. 6 construction, split fuselage support 58 and transmission support 52 are identical with the FIG. 5 construction except that elastomeric spherical bearings 62' and 54' are substituted for the plain spherical bearings 62 and 54 of the FIG. 5 construction. These and the other elastomeric bearings of the FIG. 6 construction comprise alternate bonded layers of elastomer and metal. This construction provides the same fail-safe feature in FIG. 6 as in FIG. 5. In the FIG. 6 construction, both the isolator and shaft 42 are symmetric about axis 40 and shaft end 48 projects from support 58 and carries inertial mass 64 at the end thereof. The opposite end of shaft 42 extends in the opposite direction from central portion 50 and is identified as foreshortened shaft end 44'. Shaft end 44' is foreshortened in comparison to the FIGS. 3 and 5 elongated flexible shaft end 44 and is of considerably reduced flexibility with respect thereto. Shaft position restorer 110 is preferably of frusto-conical shape and extends between spherical elastomeric bearing 60', which envelops and engages shaft tip 46' in a slip fit relationship, and elastomeric bearing spring 112, whose outer race is formed by conical housing 114 and whose inner race 116 is supported from fuselage mount 58 by support ring 118. Elastomeric spherical bearings 60', 62', 54' and 112 have their focal points on shaft member axis 40 when shaft member 42 is in its FIG. 6 solid line, unloaded, undeflected position.

FIG. 6 depicts the modified isolator in lateral load mode in which a load in plane 38 of axes 34 and 36 causes shaft end 44' to deflect to its phantom line position, thereby causing the deflection of the focal point 120 of transmission support 52 and spherical bearing 54' to shift to point 120a. This deflection of shaft end 44' causes a simultaneous and accentuated deflection of shaft end 48 and its inertial mass 64, due to the approximately 10:1 distance ratios between nodal point 66 and focal point 120, and nodal point 66 and inertial mass 64. This deflection under load, whether steady state or vibratory, of shaft and 44' simultaneously with the deflection of shaft end 48 imposes equal and opposite forces on shaft 42 at fuselage support 58 so as to establish nodal point 66 and hence, vibration isolation between the transmission and the fuselage at nodal point 66. Shaft end position restorer 110 deflects to its FIG. 6 phantom position with shaft end 44' when shaft 42 is loaded as described above. When the shaft loading is reduced or removed, spherical elastomeric spring 112 imposes a position restoring force on shaft end 44' to cause the sum of the moments and the sum of the forces acting on shaft 42 to become zero so that the shaft is restored to its zero load solid line FIG. 6 position. It will accordingly be noted that in FIG. 6 construction, the axial dimension of the isolator is reduced by substituting foreshortened shaft end 44' for the elongated shaft 44 of the FIGS. 3 and 5 configurations, the shaft restorer mechanism 110 serves to connect shaft end 46 to the fuselage through fuselage support 58 and also serves to impose a restoring moment on shaft 44' when under deflection, and that elastomer spring 112 provides the spring in the FIG. 6 construction as a substitute for the spring provided in the FIG. 3 and FIG. 5 constructions by the flexing of elongated shaft end 44.

We wish it to be understood that we do not desire to be limited to the exact details of construction shown and described, for obvious modifications will occur to a person skilled in the art.

We claim:

1. A six degree of freedom vibration isolation support system comprising:
    a first member prone to generate vibrations at a predominant frequency,
    a second member adapted to be suspended from said first member for linear motion along and rotational motion about first, second and third mutually perpendicular axes, said second and third axes lying in a common plane,
    suspension means interconnecting said first and second members to suspend said second member from said first member for relative linear and rotational motion therebetween along and about said axes, to transmit already state loads therebetween, and to provide vibration force and motion isolation of said second member from said first member linearly along and rotationally about each of said axes when said first member is generating vibrations at said predominant frequency, and comprising:
        first, second, third and fourth isolators substantially equally spaced circumferentially about said first axis and having axes which are successively perpendicular and lying in said common plane so that the axes of the opposite isolator pair comprising the first and third isolators are parallel to each other and to said third axis and perpendicular to the parallel axes of the other opposite isolator pair comprising the second and fourth isolators whose axes are parallel to each other and to said second axis,
        each of said isolators being concentric about its axis and including:
            a flexible shaft member concentric about the isolator axis and including first and second flexible ends, and having a central portion positioned between said flexible ends,
            first support means supporting said shaft member central portion from said first member so as to permit both axial and universal motion therebetween,
            second and third axially spaced support means connecting the central portion and the first flexible end of said shaft member to said second member, respectively, so as to permit universal motion therebetwen at both connecting stations and axial motion at one of the stations and so that said shaft first flexible end forms a flexible spring between said first support means and said second and third support means and so that said second flexible end of said shaft member extends along the shaft axis in cantilever fashion beyond said second support means,
            an inertial member of selected mass connected to and supported from said shaft second flexible end at a selected distance from said second support means so that the spring force applied to the second support means by the shaft flexible spring when deflected under vibratory load is equal and opposite to the force simultaneously applied to the second support means by the inertial member suspended from the shaft flexible second end to thereby establish an antiresonant condition when the first member is generating vibrations at said predominant frequency, to thereby establish a vibratory node at said second support means between the shaft member and the second member so that vibration forces and motions are not imparted therethrough from the first member to the second member,
        said four isolators therefore functioning so that when said first member is generating vibrations at said predominant frequency:
            vibration forces and motions along said first axis are not imparted from the first member to the second member due to the antiresonant nodal connection therebetween at said second support means of each isolator,
            vibratory forces and motions along said second axis are not imparted from the first member to the second member due to the antiresonant nodal connection therebetween at said second support means of said first and third isolators, and the axial displacement of said second and fourth isolators,
            vibratory forces and motions along said third axis are not imparted from the first member to the second member due to the antiresonant nodal connection therebetween at said second support means of the second and fourth isolators, and the axial displacement of said first and third isolators,
            vibratory moment forces and motions around the first axis are not imparted from the first member to the second member due to equal axial displacement of all isolators, and the antiresonant nodal connection therebetween at said second support means of each of the four isolators,
            vibratory moment forces and motions around the third axis are not imparted from said first member to said second member due to the loading in a first direction at the antiresonant nodal connection therebetween at said second support means of the first and fourth isolators and in the opposite direction at the antiresonant nodal connection therebetween at said second support means of the second and third isolators, and
            vibratory moment forces and motions around the second axis are not imparted from said first member to said second member due to the loading in a first direction at the antiresonant nodal connection therebetween at said second support means of the first and second isolators and in the opposite direction at the antiresonant nodal connection therebetween at said second support means of the third and fourth isolators.

2. Apparatus according to claim 1 wherein said first member is a helicopter rotor driving transmission, and wherein said second member is a helicopter fuselage and wherein said first, second and third mutually perpendicular axes are the vertical, lateral and longitudinal axes of the fuselage, respectively.

3. Apparatus according to claim 2 wherein said isolator shaft member is of circular cross section and its first flexible end is tapered so as to reduce in cross-sectional area in a direction away from the shaft member central portion.

4. Apparatus according to claim 3 wherein each isolator is equally flexible in the direction of the vertical axis and in the direction of the common plane of the lateral and longitudinal axes so that each isolator has two degress of isolation freedom.

5. Apparatus according to claim 4 and including parameter responsive means operable to selectively position the inertial member on the shaft second flexible end as a function of the controlling parameter to thereby vary the predominant frequency at which the isolators establish the antiresonant nodal connection between the helicopter transmission and the helicopter fuselage at the second support means of each isolator.

6. Apparatus according to claim 4 and including failsafe means to retain said shaft member connected to said first support means and hence operative to connect said fuselage to said transmission when said shaft member fails at said second support means.

7. A helicopter having mutually perpendicular vertical longitudinal and lateral intersecting axes and including:
   a fuselage,
   a rotor drive transmission,
   a helicopter rotor extending from said transmission and driven thereby,
   suspension means supporting said fuselage from said transmission comprising three or more symmetric vibration isolators connecting the transmission and the fuselage so as to permit relative motion therebetween both linearly along and rotationally about each of said axes, to transmit steady state loads therebetween, and to provide vibration force and motion isolation of the fuselage from the transmission linearly along and rotationally about each of said axes when the rotor is generating and transmitting to the transmission vibrations at a predominant frequency,
   said symmetric vibration isolators being substantially equally spaced circumferentially about and having axes oriented perpendicular to the vertical axis and lying in the plane of the longitudinal and lateral axes, and
   each isolator comprising a shaft member connected to the transmission in slip-fit fashion to provide axial motion of said shaft and said shaft is also connected to the fuselage, and constructed to have a first end which is equally flexible in the direction of the vertical axis and in the common plane of the longitudinal and lateral axes in response to vibration loading of said isolations in transmitting transmission vibrations to the fuselage, and to have a second inertially weighted end deflectable simultaneously with flexing of the first shaft member end under vibratory loading to develop a vibratory node at the point of connection between the transmission and the fuselage when the transmission is vibrating at the predominant frequency and to permit axial motion between the transmission and the fuselage at this point of connection to thereby provide vibration force and motion isolation of the fuselage from the transmission linearly along and rotationally about each of said axes to thereby provide vibration isolation of the fuselage from the transmission in six degrees of freedom.

8. A helicopter having mutually perpendicular vertical, longitudinal and lateral intersecting axes and including:
   a fuselage,
   a rotor drive transmission,
   a helicopter rotor extending from said transmission and driven thereby,
   suspension means supporting said fuselage from said transmission comprising three or more symmetric vibration isolators positioned between the transmission and the fuselage so as to permit relative motion therebetween both linearly along and rotationally about each of said axes, to transmit steady state loads therebetween, and to provide vibration force and motion isolation of the fuselage from the transmission linearly along and rotationally about each of said axes when the rotor is generating and transmitting to the transmission vibrations at a predominant frequency,
   said symmetric vibration isolators being substantially equally spaced circumferentially about and having axes oriented perpendicular to the vertical axis and lying in the plane of the longitudinal and lateral axes and connecting said transmission to said fuselage, and
   each isolator comprising a shaft member connected to the transmission in slip-fit fashion to provide axial motion of said shaft and said shaft is also connected to the fuselage, and constructed to have a first end which is equally deflectable under vibratory load in the direction of the vertical axis and in the common plane of the longitudinal and lateral axes, and to have a second inertially weighted end deflectable simultaneously with said first end, and means to spring bias said shaft first end so deflected to its unloaded position so that said shaft first and second ends so deflected impose cancelling forces on said shaft member to establish a vibratory node at the point of connection between the transmission and the fuselage when the transmission is vibrating at the predominant frequency and to permit axial motion between the transmission and the fuselage at this point of connection to thereby provide vibration force and motion isolation of the fuselage from the transmission linearly along and rotationally about each of said axes to thereby provide vibration isolation of the fuselage from the transmission in six degrees of freedom.

9. A six degree of freedom vibration isolation support system comprising:
   a first member prone to generate vibrations at a predominant frequency,
   a second member adapted to be suspended from said first member for linear motion along and rotational motion about first, second and third mutually perpendicular axes, said second and third axes lying in a common plane, suspension means interconnecting said first and second members to suspend said second member from said first member for relative linear and rotational motion therebetween along and about said axes, to transmit steady state loads therebetween, and to provide vibration force and motion isolation of said second member from said first member linearly along and rotationally about each of said axes when said first member is generating vibrations at said predominant frequency, and comprising:

first, second, third and fourth symmetric isolators substantially equally spaced circumferentially about said first axis and having axes which are successively perpendicular and lying in said common plane so that the axes of the opposite isolator pair comprising the first and third isolators are parallel to each other and to said third axis and perpendicular to the parallel axes of the other opposite isolator pair comprising the second and fourth isolators whose axes are parallel to each other and to said second axis, each of said isolators being concentric about its axis and including:

a shaft member concentric about the isolator axis and including first and second ends, and having a central portion positioned between said ends, first support means supporting said shaft member central portion from said first member so as to permit both axial and universal motion therebetween, second and third axially spaced support means connecting the central portion and the first end of said shaft member to said second member, respectively, so as to permit universal motion therebetween at both connecting stations and axial motion between said third support means and the shaft member first end, said third support means including an elastomeric spherical bearing which responds to shaft deflection under vibration loading to form a spring between said first support means and said second and third support means to provide a shaft member position restoring force toward the shaft member unloaded position and so that said second flexible end of said shaft member extends along the shaft axis in cantilever fashion beyond said second support means, an inertial member of selected mass connected to and supported from said shaft second flexible end at a selected distance from said second support means so that the spring force applied to the second support means by said spring when the shaft first end is deflected under vibratory load is equal and opposite to the force simultaneously applied to the second support means by the inertial member suspended from the shaft second end to thereby establish an antiresonant condition when the first member is generating vibrations at said predominant frequency, to thereby establish a vibratory node at said second support means between the shaft member and the second member so that vibration forces and motions are not imparted therethrough from the first member to the second member, said four isolators therefore functioning so that, when said first member is generating vibrations at said predominant frequency;

vibration forces and motions along said first axis are not imparted from the first member to the second member due to the antiresonant nodal connection therebetween at said second support means of each isolator, vibratory forces and motions along said second axis are not imparted from the first member to the second member due to the antiresonant nodal connection therebetween at said second support means of said first and third isolators, and the axial displacement of said second and fourth isolators, vibratory forces and motions along said third axis are not imparted from the first member to the second member due to the antiresonant nodal connection therebetween at said second support means of the second and fourth isolators, and the axial displacement of said first and third isolators, vibratory moment forces and motions around the first axis are not imparted from the first member to the second member due to equal axial displacement of all isolators, and the antiresonant nodal connection therebetween at said second support means of each of the four isolators, vibratory moment forces and motions around the third axis are not imparted from said first member to said second member due to the loading in a first direction at the antiresonant nodal connection therebetween at said second support means of the first and fourth isolators and in the opposite direction at the antiresonant nodal connection therebetween at said second support means of the second and third isolators, and vibratory moment forces and motions around the second axis are not imparted from said first member to said second member due to the loading in a first direction at the antiresonant nodal connection therebetween at said second support means of the first and second isolators and in the opposite direction at the antiresonant nodal connection therebetween at said second support means of the third and fourth isolators.

10. Apparatus according to claim 9 wherein said first member is a helicopter rotor driving transmission, and wherein said second member is a helicopter fuselage and wherein said first, second and third mutually perpendicular axes are the vertical, lateral and longitudinal axes of the fuselage, respectively.

11. Apparatus according to claim 10 wherein said isolator shaft member is of circular cross section and said spring is a spherical elastomeric bearing whose focal point is located on the shaft member axis when the shaft member is in its unloaded condition.

12. Apparatus according to claim 11 wherein each isolator is equally deflectable in the direction of the vertical axis and in the direction of the common plane of the lateral and longitudinal axes so that each isolator has two degrees of isolation freedom.

13. Apparatus according to claim 12 and including parameter responsive means operable to selectively position the inertial member on the shaft second end as a function of the controlling parameter to thereby vary the predominant frequency at which the isolators establish the antiresonant nodal connection between the helicopter transmission and the helicopter fuselage at the second support means of each isolator.

14. Apparatus according to claim 12 and including fail-safe means to connect first support means to the second support means when said shaft member moves under load axially or laterally beyond selected limits.

15. Apparatus according to claim 14 and wherein said third support means comprises an elastomeric spherical bearing enveloping and engaging said shaft member first end tip in a slip fit relationship so as to permit axial relative motion therebetween, a frusto-conically shaped housing member forming the outer race of said spherical bearing and the outer race of said spherical bearing spring, and means structurally connecting the inner race of said spherical bearing spring to said second support member.

* * * * *

UNITED STATES PATENT AND TRADEMARK OFFICE
CERTIFICATE OF CORRECTION

PATENT NO. : 4,405,101

DATED : September 20, 1983

INVENTOR(S) : RAYMOND G. CARLSON ET AL

It is certified that error appears in the above-identified patent and that said Letters Patent is hereby corrected as shown below:

| | |
|---|---|
| Col. 3, Line 59 | "24" should read --26-- |
| Col. 4, Line 31 | "56" should read --58-- |
| Col. 5, Line 4 | "to" should read --so-- |
| Col. 6, Line 29 | "88" should read --98-- |
| Col. 7, Line 11 | "in" should read --to-- |
| Line 47 | "air" should read --six-- |
| Line 56 | "nodel" should read --nodal-- |
| Col. 8, Line 11 | "26" should read --28-- |
| Line 15 | "1" should read --2-- |
| Col. 11, Lines 19/20 | "degress" should read --degrees-- |

Signed and Sealed this

Fifteenth Day of October 1985

[SEAL]

Attest:

DONALD J. QUIGG

Attesting Officer

Commissioner of Patents and
Trademarks—Designate